US 11,905,853 B2

(12) United States Patent
Buonvino et al.

(10) Patent No.: US 11,905,853 B2
(45) Date of Patent: Feb. 20, 2024

(54) TURBINE ENGINE COMPONENT WITH A SET OF DEFLECTORS

(71) Applicant: GE Avio S.r.l., Rivalta di Torino (IT)

(72) Inventors: Alberto Buonvino, Turin (IT); Luca Giacobone, Turin (IT); Daniele Coutandin, Avigliana (IT); Ernesto Sozio, Orbassano (IT); Francesco Bertini, Piossasco (IT)

(73) Assignee: GE AVIO S.r.l., Rivalta di Torino (IT)

( * ) Notice: Subject to any disclaimer, the term of this patent is extended or adjusted under 35 U.S.C. 154(b) by 0 days.

(21) Appl. No.: 17/228,778

(22) Filed: Apr. 13, 2021

(65) Prior Publication Data

US 2021/0381389 A1 Dec. 9, 2021

(30) Foreign Application Priority Data

Jun. 8, 2020 (IT) .......................... 102020000013609

(51) Int. Cl.
  *F01D 9/04* (2006.01)
  *F01D 5/14* (2006.01)
  *F01D 11/00* (2006.01)

(52) U.S. Cl.
  CPC .............. *F01D 9/041* (2013.01); *F01D 5/14* (2013.01); *F01D 5/141* (2013.01); *F01D 11/001* (2013.01); *F01D 11/006* (2013.01); *F05D 2220/32* (2013.01); *F05D 2240/12* (2013.01); *F05D 2240/30* (2013.01)

(58) Field of Classification Search
  CPC . F01D 9/041; F01D 5/14; F01D 5/141; F01D 11/001; F01D 11/005; F05D 2220/32; F05D 2240/12; F05D 2240/30; F05D 2240/126

See application file for complete search history.

(56) References Cited

U.S. PATENT DOCUMENTS

| 881,474 | A | * | 3/1908 | Jude ........................ F01D 11/08 |
| | | | | 415/77 |
| 6,152,690 | A | | 11/2000 | Tomita et al. |
| 7,665,964 | B2 | | 2/2010 | Taylor et al. |
| 8,262,342 | B2 | | 9/2012 | Morris et al. |
| 8,419,356 | B2 | * | 4/2013 | Little ...................... F01D 11/02 |
| | | | | 415/173.1 |
| 8,616,838 | B2 | * | 12/2013 | Chiu ..................... F01D 11/001 |
| | | | | 415/168.1 |
| 9,181,816 | B2 | * | 11/2015 | Lee ......................... F01D 11/02 |
| 9,360,216 | B2 | | 6/2016 | Hase et al. |
| 9,945,248 | B2 | | 4/2018 | McCaffrey |

(Continued)

FOREIGN PATENT DOCUMENTS

| EP | 2428648 A2 | 3/2012 |
| EP | 3037674 A1 | 6/2016 |

OTHER PUBLICATIONS

Italian Search Report corresponding to Italian Application No. 102020000013609 filed Jun. 8, 2020.

*Primary Examiner* — Brian Christopher Delrue (74) *Attorney, Agent, or Firm* — McGarry Bair PC (57) ABSTRACT

An airfoil assembly defining a primary airflow path for a turbine engine comprising a platform, an airfoil extending from the platform and into at least a portion of the primary airflow path, a secondary airflow path comprising air from the primary airflow path, and a deflector provided within the secondary airflow path.

16 Claims, 6 Drawing Sheets

(56) References Cited

U.S. PATENT DOCUMENTS

| | | |
|---|---|---|
| 10,240,461 B2 | 3/2019 | Ratzlaff et al. |
| 10,544,695 B2 * | 1/2020 | Chouhan ............... F01D 11/001 |
| 10,590,774 B2 * | 3/2020 | Chouhan ................ F01D 5/147 |
| 10,648,353 B2 * | 5/2020 | Aggarwala ............. F01D 11/02 |
| 2002/0159880 A1 | 10/2002 | Morris et al. |
| 2006/0269399 A1 * | 11/2006 | Girgis ..................... F01D 11/04 |
| | | 415/115 |
| 2012/0060506 A1 * | 3/2012 | King ........................ F02C 6/08 |
| | | 60/785 |
| 2013/0189107 A1 * | 7/2013 | Krishnan .............. F01D 11/001 |
| | | 416/193 R |
| 2016/0177833 A1 * | 6/2016 | Simon-Delgado ...... F01D 5/085 |
| | | 415/1 |
| 2018/0149022 A1 * | 5/2018 | Wang ........................ F01D 5/02 |
| 2019/0186280 A1 | 6/2019 | Clayton |
| 2019/0330992 A1 | 10/2019 | Klingels |

* cited by examiner

TURBINE ENGINE COMPONENT WITH A SET OF DEFLECTORS

STATEMENT REGARDING FEDERALLY SPONSORED RESEARCH OR DEVELOPMENT

The project leading to this application has received funding from the Clean Sky 2 Joint Undertaking under the European Union's Horizon 2020 research and innovation program under grant agreement No. CS2-LPA-GAM-2018/2019-01.

CROSS REFERENCE TO RELATED APPLICATIONS

This application claims benefit to Italian Provisional Application No. 102000013609, filed Jun. 8, 2020, which is incorporated herein by reference in its entirety.

TECHNICAL FIELD

This disclosure generally relates to turbine engines, and more specifically to gas flow through turbine engines.

BACKGROUND

Turbine engines, and particularly gas or combustion turbine engines, are rotary engines that extract energy from a flow of combusted gases passing through the engine onto a multitude of compressor and turbine stages, with each stage typically including a complementary set of rotating blades and stationary vanes.

During operation, the rotation of blades drives the working airflow to the downstream vane in such a way as to create a component of the working air flow that is tangential to and opposite the direction of rotation of the upstream blades. This opposite or tangential flow can negatively impact the efficiency of a turbine engine.

BRIEF DESCRIPTION

In one aspect, the present disclosure relates to an airfoil assembly defining a primary airflow path for a turbine engine comprising a platform, an airfoil extending from the platform and into at least a portion of the primary airflow path, the airfoil having an outer wall bounding an interior and defining a pressure side and a suction side extending between a leading edge and a trailing edge to define a chord-wise direction and extending radially between a root and a tip to define a span-wise direction, with the root being adjacent the platform, a secondary airflow path, comprising air from the primary airflow path, formed by at least a portion of the platform and a deflector provided on the platform and within the secondary airflow path.

In another aspect, the present disclosure relates to a method of operating a turbine engine having at least one stage, in either a compressor section or a turbine section, having an upstream set of airfoils and a downstream set of airfoils, the method comprising rotating in a first rotational direction the upstream set of airfoils to generate an exit airflow leaving the upstream airfoils with a tangential velocity component opposite the first rotational direction, and deflecting at least a portion of the exit airflow, before it reaches the downstream set of airfoils, to have a tangential velocity component in line with the first rotational direction.

DETAILED DESCRIPTION

Aspects of the disclosure described herein are directed to an airfoil assembly defining a primary airflow path. The airfoil assembly can include an airfoil coupled to a platform which at least partially defines a secondary airflow path. The primary airflow path can include a primary airflow or a working airflow which passes over and is redirected by a set of airfoils included within the airfoil assembly. The secondary airflow path can include a secondary airflow branching from the primary airflow. A deflector, located in a portion of the secondary airflow path, can be provided to redirect at least a portion of the secondary airflow. For purposes of illustration, the present disclosure will be described with respect to a turbine blade in the turbine for an aircraft turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

To counter the effects of windage losses associated with a rotation of a set of airfoils included within the airfoil assembly, the deflectors can redirect the secondary airflow. Specifically, the deflector can redirect a tangential component of the secondary airflow entering the secondary airflow path such that it is in the same direction as the rotation of direction of the set of airfoils upstream the deflector. This results in the reduction of windage losses and in some cases the increase in power output of the turbine engine.

While "a set of" various elements will be described, it will be understood that "a set" can include any number of the respective elements, including only one element. As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
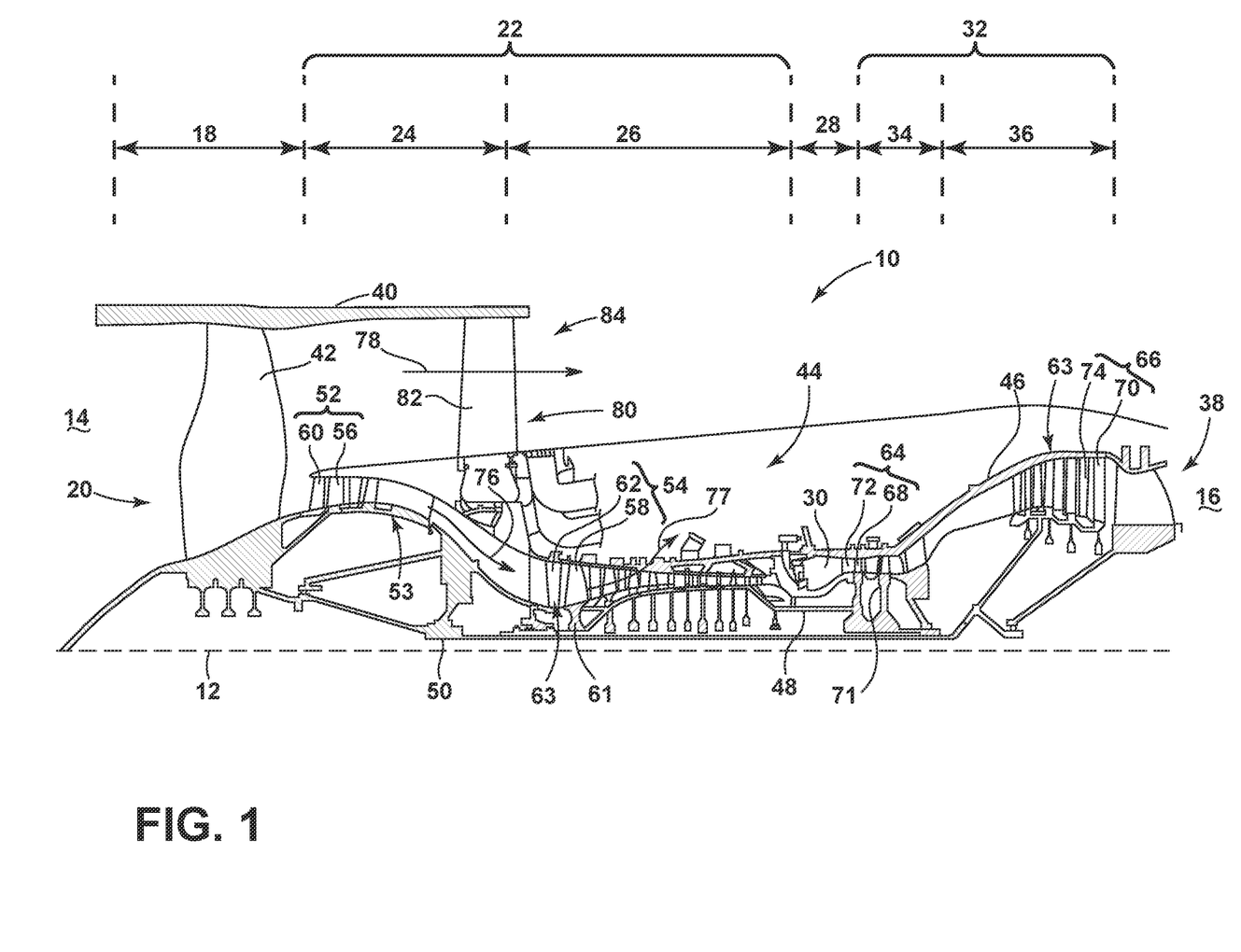
FIG. 1 is a schematic cross-sectional diagram of a turbine engine for an aircraft.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a engine core 44 of the turbine engine 10, which generates combustion gases. The engine core 44 is surrounded by core casing 46, which can be coupled with the fan casing 40.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP and LP spools 48, 50 are rotatable about the engine centerline 12 and couple to a plurality of rotatable elements, which can collectively define a rotor.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by, for example, the bleed air 77 is necessary for operating of such engine components in the heightened temperature environments.

A remaining portion of the airflow 78 bypasses the LP compressor 24 and engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

It is contemplated that a geared portion or a gear box can be included within at least a portion of the turbine engine 10. The geared portion can be configured to rotate one or more portions of the turbine engine 10 at a desired rotational velocity. For example, the LP spool 50 can be segmented such that the portion of the LP spool 50 connected to the LP turbine 36 acts as an input to a gear box of the LP spool. The remaining portion of the LP spool 50 can act as an output from the gear box of the LP spool and be operatively coupled to the fan 20 and the LP compressor 24. The gear box of the LP spool can be configured to provide a gear reduction between the LP turbine 36, the LP compressor 24, and the fan 20. As such, the LP compressor 24 and the fan 20 can rotate a first rotational velocity, while the LP turbine can rotate at a second rotational velocity different than the first rotational velocity. It will be appreciated that this is non-limiting example and that the geared portion can be applied to any suitable portion of the turbine engine 10.

Figure 2:
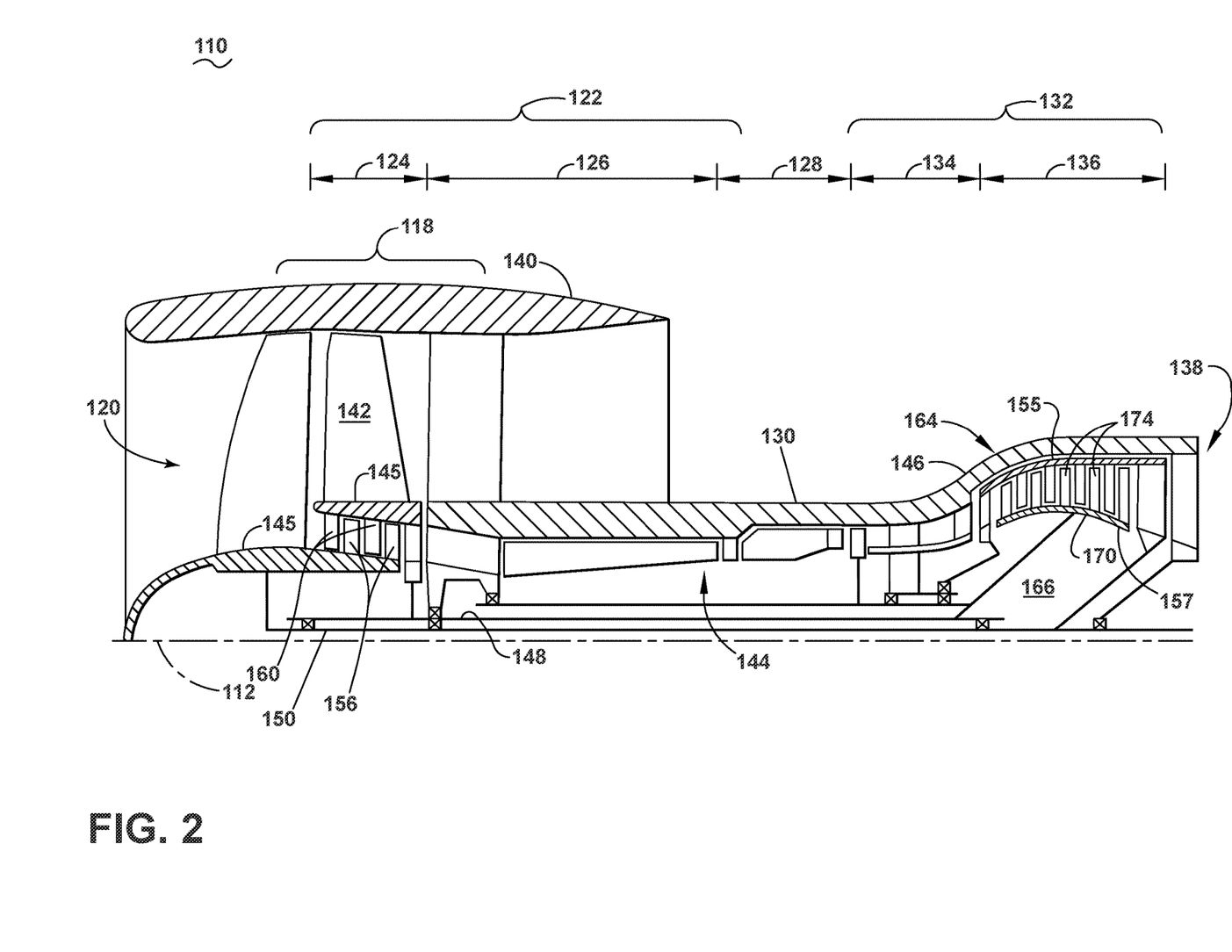
FIG. 2 is a schematic cross-sectional diagram of another turbine engine of FIG. 1, including counter-rotating sections.

FIG. 2 is a schematic cross-sectional diagram of a turbine engine 110 for an aircraft, the turbine engine 110 can be a counter-rotating turbine engine. The turbine engine 110 is similar to the turbine engine 10, therefore, like parts will be identified with like numerals increased by 100, with it being understood that the description of the like parts of the turbine engine 10 applies to the turbine engine 110 unless otherwise noted. The turbine engine 110 includes a counter-rotating LP compressor 124, an HP compressor 126, an HP turbine 134, and a counter rotating LP turbine 136.

The counter-rotating LP compressor 124 can include a first set of compressor airfoils 160 and a second set of compressor airfoils 156. Each the first set and the second set of compressor airfoils 160, 156 can be mounted on a respective rotor disc of a pair of rotor discs 145. The first and the second set of compressor airfoils 160, 156 can be configured to rotate about the longitudinal axis 112. Alternatively, one or more of the first or the second set of compressor airfoils 160, 156 can be static.

The counter-rotating LP turbine 136 includes an outer rotor 155 positioned radially inward from a core casing 146. The outer rotor 155 can have a generally frusto-conical shape. The outer rotor 155 can include a first set of turbine airfoils 174. The first set of turbine airfoils 174 can extend radially inwardly from the outer rotor 155 towards the longitudinal axis 112. The first set of turbine airfoils 174 differ from the static turbine vanes 74 (FIG. 1) in that the first set of turbine airfoils 174 can be a first set of rotating blades comprised of a plurality of circumferentially arranged blades.

The counter-rotating LP turbine 136 further includes an inner rotor/stator 157 that is at least in part circumscribed by the outer rotor 155. The inner rotor/stator 157 can be stationary or rotate depending on the particular engine configuration. As illustrated by way of example, the inner rotor/stator 157 is arranged substantially coaxially with respect to, and radially inward of the outer rotor 155. The inner rotor/stator 157 includes a second set of turbine airfoils 170, circumferentially arranged, where each airfoil of the second set of turbine airfoils 170 extends radially outwardly away from the longitudinal axis 112. The second set of turbine airfoils 170 can be a first set of rotating blades comprised of a plurality of circumferentially arranged blades. Alternatively, the second set of turbine airfoils 170 can be stationary.

The first and second sets of airfoils 174, 170 define a plurality of turbine stages 166. While illustrated as having five stages, it should be understood that any quantity of stages is contemplated and the stages shown are for illustrative purposes and not meant to be limiting.

Figure 3:
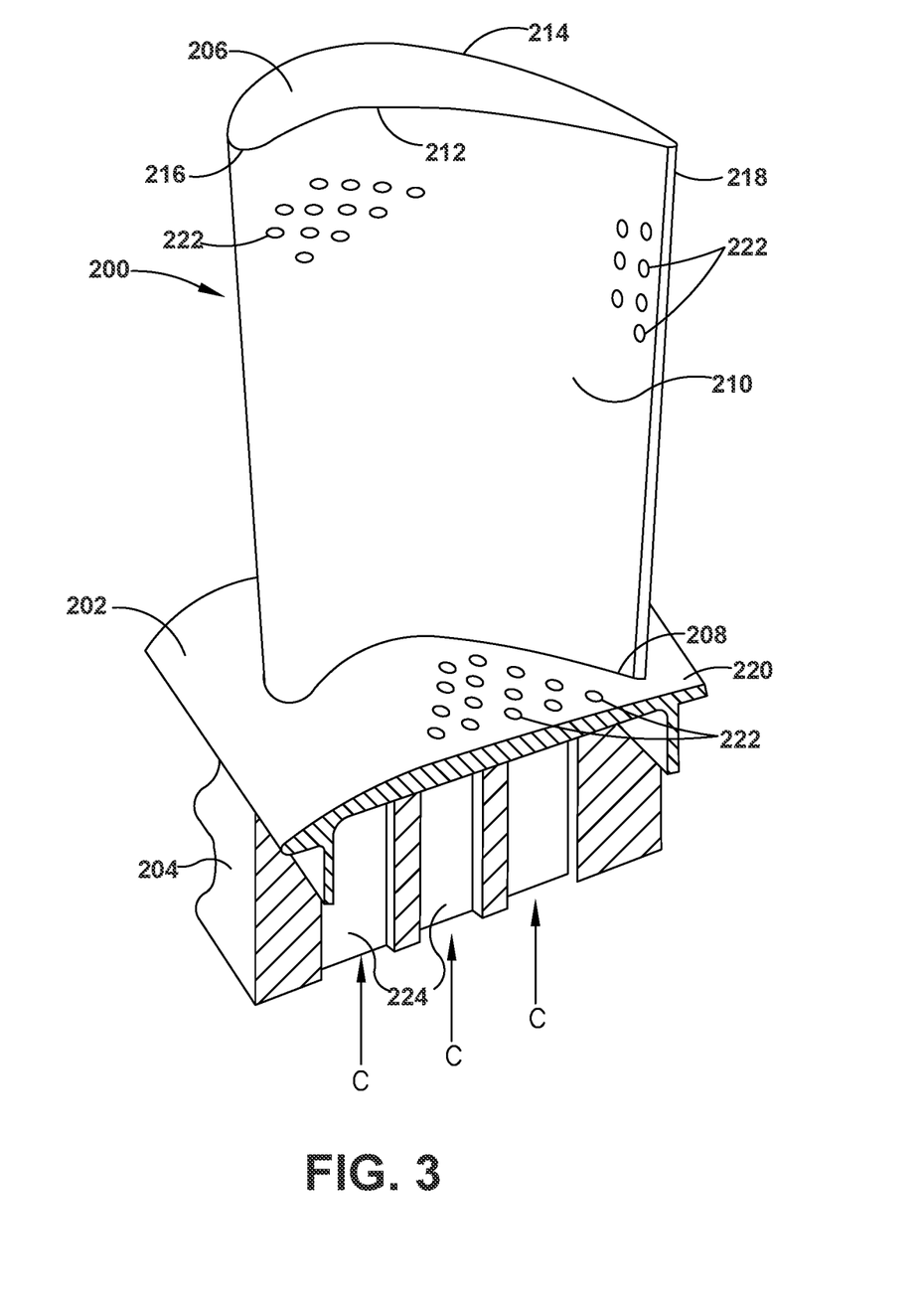
FIG. 3 is a perspective view of the turbine engine of FIG. 2 including an airfoil.

As a non-limiting example, FIG. 3 is a perspective view of an example of an engine component illustrated as an airfoil 200 extending from a platform 202, with a dovetail 204 depending from the platform 202. The airfoil 200 can be a rotating blade in either the compressor section 122 or the turbine section 132 of the turbine engine 110, as shown in FIG. 2. Alternatively, it is contemplated that the airfoil 200 can be a stationary vane in either the compressor section 122 or the turbine section 132 of the turbine engine 110 of FIG. 2. Although illustrated as the engine component for turbine engine 110, it will be appreciated that the engine component can be applied to any suitable portion of turbine engine 10 of FIG. 1.

The airfoil 200 extends from a tip 206 to a root 208 to define a span-wise direction. The airfoil 200 includes a peripheral outer wall 210, which can be functionally divided into a pressure side 212 and a suction side 214, demarcated by a leading edge 216 and a trailing edge 218. A line extending between the leading edge and trailing edge generally defines a chord-wise direction, which may or may not be parallel to the rotational axis of the engine.

The airfoil 200 mounts to the platform 202 at the root 208. The platform can be an annual band extending around the entirety of the longitudinal axis 112. A platform wall 220 defines the platform 202. The platform wall 220 can be further defined as an upper surface. A lower surface of the platform 220 can oppose the upper surface. The lower surface can be defined to be radially inward the upper surface with respect to the longitudinal axis 112.

A set of cooling holes 222 can be formed in any wall of the component including the outer wall 210 or the platform wall 202 as illustrated. The set of cooling holes 222 can be referencing a single cooling hole or multiple cooling holes. The set of cooling holes 222 can be located by way of non-limiting example, proximate the leading edge 216, the trailing edge 218 and be located in the platform 202 on the pressure side 212 of the airfoil 200. It should be understood that the locations of the set of cooling holes 222 is for illustrative purposes only and not mean to be limiting.

The dovetail 204 can extend from the platform 202 opposite of the airfoil 200, and can be configured to mount to the any one or more of the platforms, discs, or rotors in the compressor section 122 or turbine section 132 of the turbine engine 110. The dovetail 204 can include a set of inlet passages 224, illustrated as three inlet passages 224. It is contemplated that the inlet passages 224 are fluidly coupled to the set of cooling holes 222 to provide a cooling fluid flow (C) for cooling the platform 202. In another non-limiting example, the inlet passages 224 can provide the cooling fluid flow (C) to an interior of the airfoil 200 for cooling of the airfoil 200. It should be appreciated that the dovetail 204 is shown in cross-section, such that the inlet passages 224 are housed within the body of the dovetail 204.

It should be understood that while the description herein is related to an airfoil, it can have equal applicability in other engine components requiring cooling via cooling holes such as film cooling. One or more of the engine components of the turbine engine 110 includes a film-cooled substrate, or wall, in which a film cooling hole, or hole, of the disclosure further herein may be provided. Some non-limiting examples of the engine component having a wall can include blades, vanes or nozzles, a combustor deflector, combustor liner, or a shroud assembly. Other non-limiting examples where film cooling is used include turbine transition ducts and exhaust nozzles.

Figure 4:
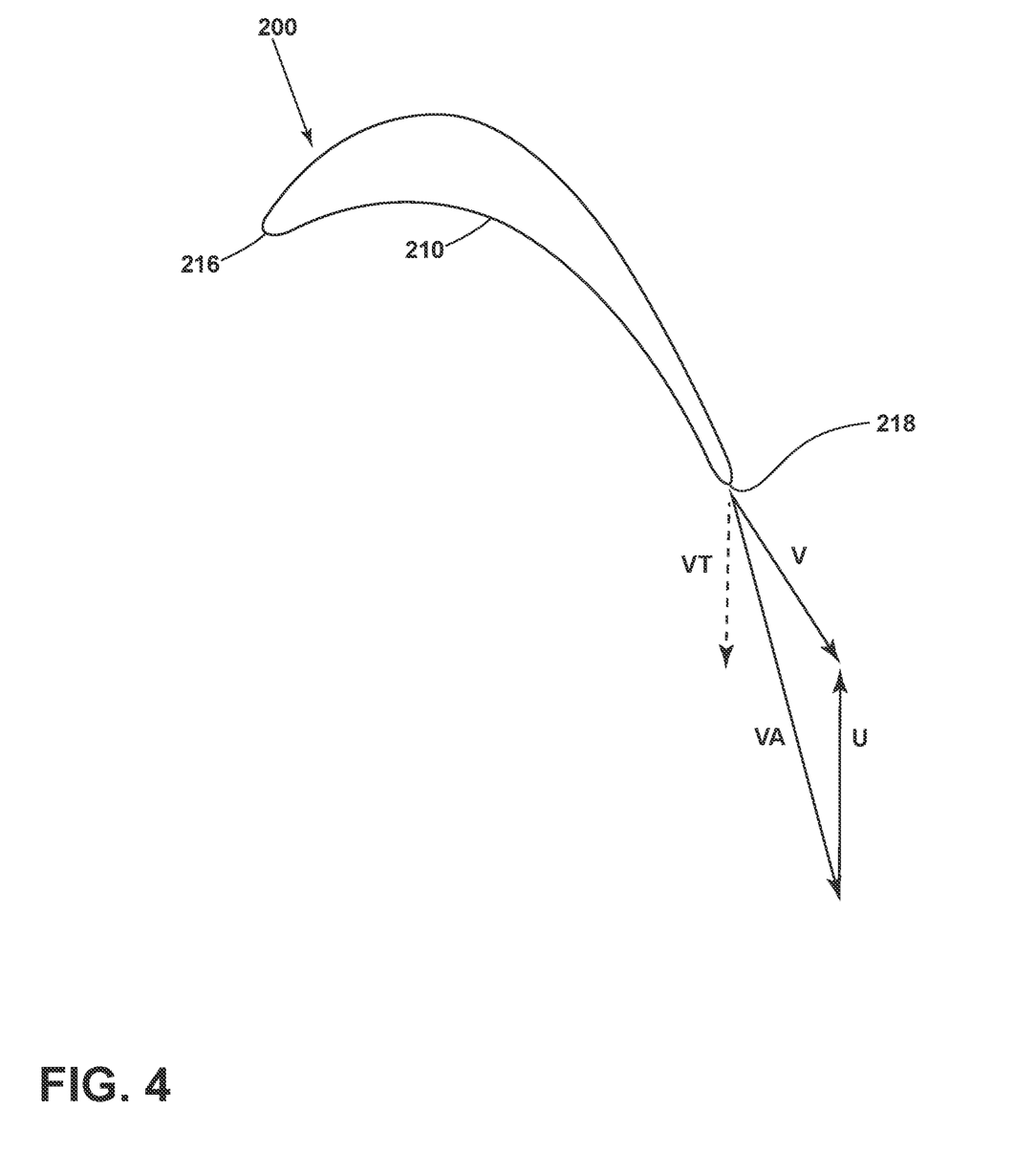
FIG. 4 is a cross-sectional view of the airfoil of FIG. 3.

FIG. 4 is a schematic view of the airfoil 200 of FIG. 3 rotating with a rotational velocity U. During operation of the turbine engine 110, a working fluid (the air flow passing axially through the turbine engine) upstream of the airfoil 200 will flow into or around the leading edge 216 and follow the contour of the airfoil 200 along the outer wall 210. The working fluid will then flow past the trailing edge 218 with an exit velocity V. The exit velocity V can include, at least, a tangential velocity component VT which directly opposes the rotational velocity U.

Figure 5:
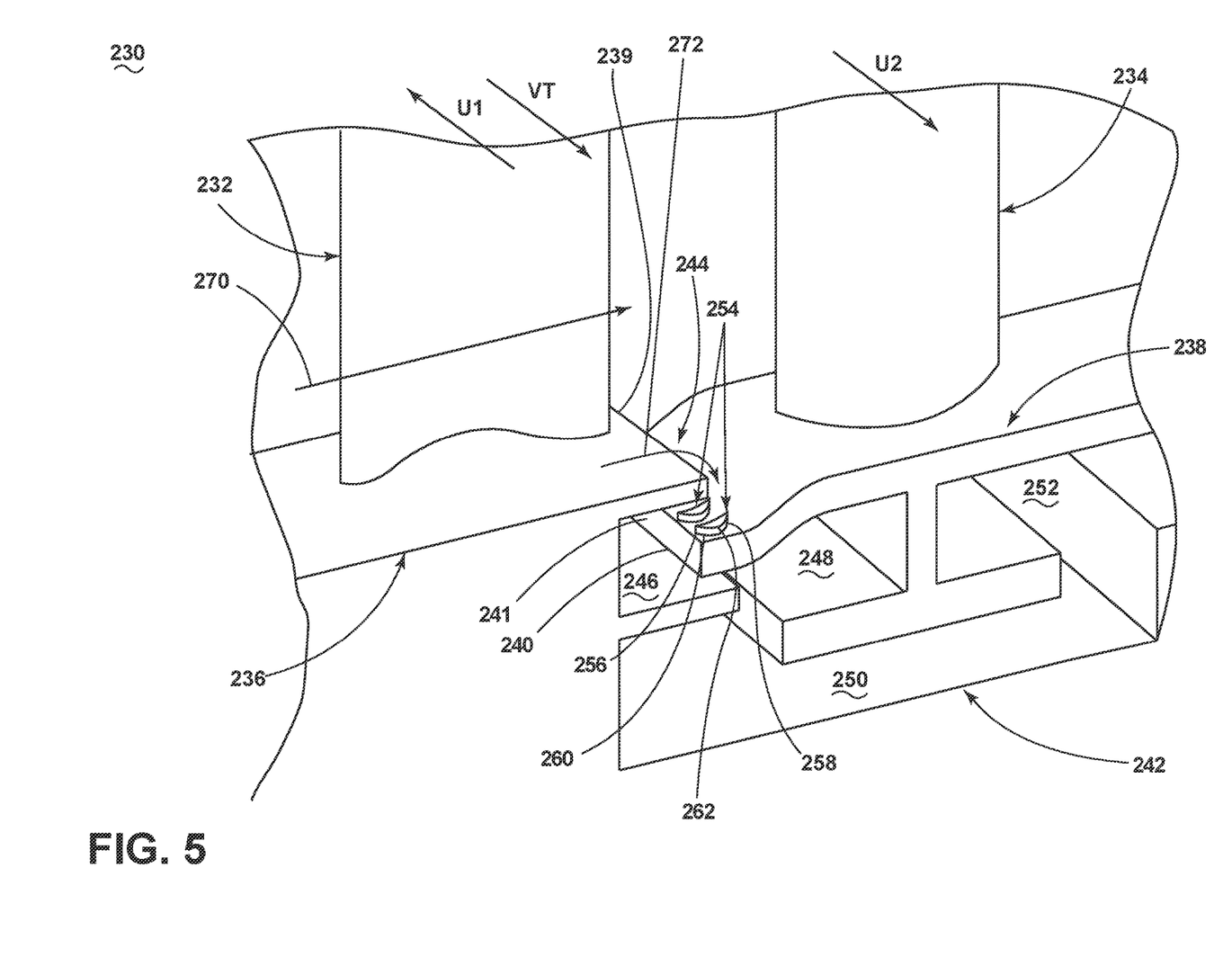
FIG. 5 is a perspective view of the turbine engine of FIG. 2, including a primary airflow path, and a secondary airflow path with a set of deflectors.

FIG. 5 is a perspective view of an airfoil assembly 230 of the turbine engine 110 of FIG. 2. Although illustrated as the turbine engine 110, it will be appreciated that aspects described herein of the airfoil assembly 230 can be applied to turbine engine 10 or any other turbine engine. It will be further appreciated that the airfoil assembly can include one or more airfoil with aspects of the airfoil 200 described in FIGS. 3-4.

As illustrated, the airfoil assembly 230 includes a first airfoil 232 and a second airfoil 234 positioned within a primary airflow path of the turbine engine 110. As used herein, the primary airflow path can be defined as a portion of the turbine engine 110 which includes the working fluid passing axially through the turbine engine 110. Specifically, the primary airflow path can be illustrated as a primary airflow 270. The first and second airfoils 232, 234 can, but it is not necessary, each include aspects of the airfoil 200 (FIG. 3). The first and the second airfoils 232, 234 can be one airfoil of a set of circumferentially arranged airfoils. The first and second airfoils 232, 234 can be identical to one another. Alternatively, the first airfoil 232 can be larger or have a different cross section than the second airfoil 234. Both the first airfoil 232 and the second airfoil 234 can rotate about the longitudinal axis 112. As such, the first airfoil 232 can rotate in a first direction while the second airfoil 234 can rotate in a second direction opposite the first direction. As such, the first and second airfoils 232, 234 can counter rotate. Alternatively, at least one of the first and second airfoils 232, 234 can be stationary.

The first and second airfoils 232, 234 can be coupled to a first annular platform 236 and a second annular platform 238, respectively. The first annular platform 236 and the second annular platform 238 can form at least a portion of a first rotor and a second rotor, respectively. As such, the first and the second set of airfoils 232, 234 can define a first and a second set of blades. The first and second annular platforms 236, 238 can each include aspects of the platform 202 (FIG. 3). As illustrated, the first annular platform 236 can include a downstream edge 239 and the second annular platform 238 can include an upstream edge 240. The upstream edge 240 can be axially upstream the downstream edge 239. Additionally, the upstream edge 240 can be disposed radially inward the downstream edge 239. The first and the second annular platforms 236, 238 can rotate about the longitudinal axis 112 in opposing directions or at different speeds. Although defined as first and second annular platforms 236, 238 or first and second rotors, it will be appreciated that either, but not both, of the first or second platforms 236, 238 can be stationary.

A secondary airflow path 242 can be included in the airfoil assembly 230. The secondary airflow path 242 can be defined as a portion of the airfoil assembly 230 in which a secondary airflow 272 is present. The secondary airflow path 242 can be annular such that it extends circumferentially about the entirety of the longitudinal axis 112. Alternatively, the secondary airflow path 242 can be segmented such that multiple, discrete secondary airflow paths 242 are circumferentially spaced about the longitudinal axis 112. The secondary airflow path 242 can be used to cool various components of the airfoil assembly 230 such as, but not limited to, the second annular platform 238.

The secondary airflow path 242 can be defined by a platform inlet 244, a first cavity 246, a second cavity 248, a platform passage 250 and an outlet cavity 252. The platform inlet 244 can be downstream both the downstream edge 239 and the upstream edge 240. The platform inlet 244 can be fluidly coupled to the secondary airflow path 242 such that the secondary airflow 272 can flow through the platform inlet 244, into the first cavity 246, then the second cavity 248, through the platform passage 250 and ultimately out the outlet cavity 252 and to a downstream portion of the second annular platform 238. The first and second cavities 246, 248 can be defined as at least a portion between the first annular platform 236 and the second annular platform 238. The first and the second cavities 246, 248 can be at least partially defined by the space between the downstream edge 239 and the upstream edge 240.

The second annular platform 238 can include or carry a set of deflectors 254 projecting radially outward from the upper surface of the second annular platform 238 and into at least a portion of the secondary airflow path 242. Specifically, the set of deflectors 254 can project from a portion of the second annular platform 238 which is located more radially inward than the downstream edge 239 of the first annular platform 236 with respect to the longitudinal axis 112. Further, it will be appreciated that at least a portion of the set of deflectors 254 can be axially forward the downstream edge 239 of the first annular platform 236. The set of deflectors 254 can be positioned downstream of the platform inlet 244 and upstream the first cavity 246. The set of deflectors 254 can extend circumferentially about the longitudinal axis 112 on the second annular platform 238. Each deflector 254 can include an airfoil cross section. In other words, each deflector of the set of deflectors 254 can be cambered with a convex side defined as a suction side, and a concave side opposite the convex side and defined as a pressure side. The pressure side of each of the deflectors 254 can be aligned in the same circumferential direction as the pressure side of the second airfoil 234. Additionally, or alternatively, one or more of the deflectors 254 can be positioned such that the pressure side of a corresponding deflector 254 is opposite the pressure side of the second airfoil 234. The set of deflectors 254 can each include a leading edge 256, a trailing edge 258, a root 260 and a tip 262. The set of deflectors 254 can extend radially between the root 260 and the tip 262 with the root 260 being adjacent the second annular platform 238. It is contemplated that the leading edge 256 can be positioned at or near the upstream edge 240 of the second annular platform 238. The set of deflectors 254 can project into at least a portion of secondary airflow path 242 such that they reduce a portion of the cross-sectional area of the secondary airflow path 242 to define a reduced cross-sectional area. As such, a local cross-sectional area of the platform inlet 244 can be larger than the reduced cross-sectional area. Alternatively, the local cross-sectional area of the platform inlet 244 can be less than the reduced cross-sectional area.

In operation of the turbine engine 110, the first annular platform 236, and hence the first airfoil 232, can rotate in a first direction about the longitudinal axis and have a first rotational velocity U1. The second annular platform 238, and hence the second airfoil 234, can rotate opposite the first annular platform 236 and have a second rotational velocity U2. Both the first airfoil 232 and the second airfoil 234 can rotate within the primary airflow path such that the working fluid, or the primary airflow 270, flows over the leading edge 216 and towards the trailing edge 218 of each respective airfoil. Through the rotation of the first annular platform 236 and a redirection of at least a portion of the primary airflow 272, the opposing tangential velocity VT is created. The tangential velocity VT can cause a portion of the primary airflow 272 to flow into secondary airflow path 242 as the secondary airflow 272 in the same direction as the tangential velocity VT. This, in turn, can form resistance against the rotation of the first annular platform 236. The set of deflectors 254, however, redirect a portion of the secondary airflow 272 near the platform inlet 244 to form a redirected velocity in the same direction as the first rotational velocity U1. As such, the set of deflectors 254 can form a turn of at least a portion of the secondary airflow 272 such that it can be redirected to be in the same direction as the first rotational velocity U1.

The redirection of the portion of the secondary airflow 272 defined to be in the same direction as the tangential velocity VT to be in the same direction as the first rotational velocity U1 reduces windage losses that would otherwise be present. For example, in conventional turbine engines without the set of deflectors 254, the secondary airflow 272 would be in the same direction as the tangential velocity VT. As such, the secondary airflow 272 would directly oppose the rotation of the first annular platform 236. As such, windage losses would be experienced. The set of deflectors 254 as described herein, however, redirect the portion of the secondary airflow 272 defined to be in the same direction of the tangential velocity VT such that it is in the same direction as the first rotational velocity U1, therefore, eliminating the effects of windage losses experienced in conventional turbine engines. This, in turn, increases the overall efficiency of the turbine engine 110.

Figure 6:
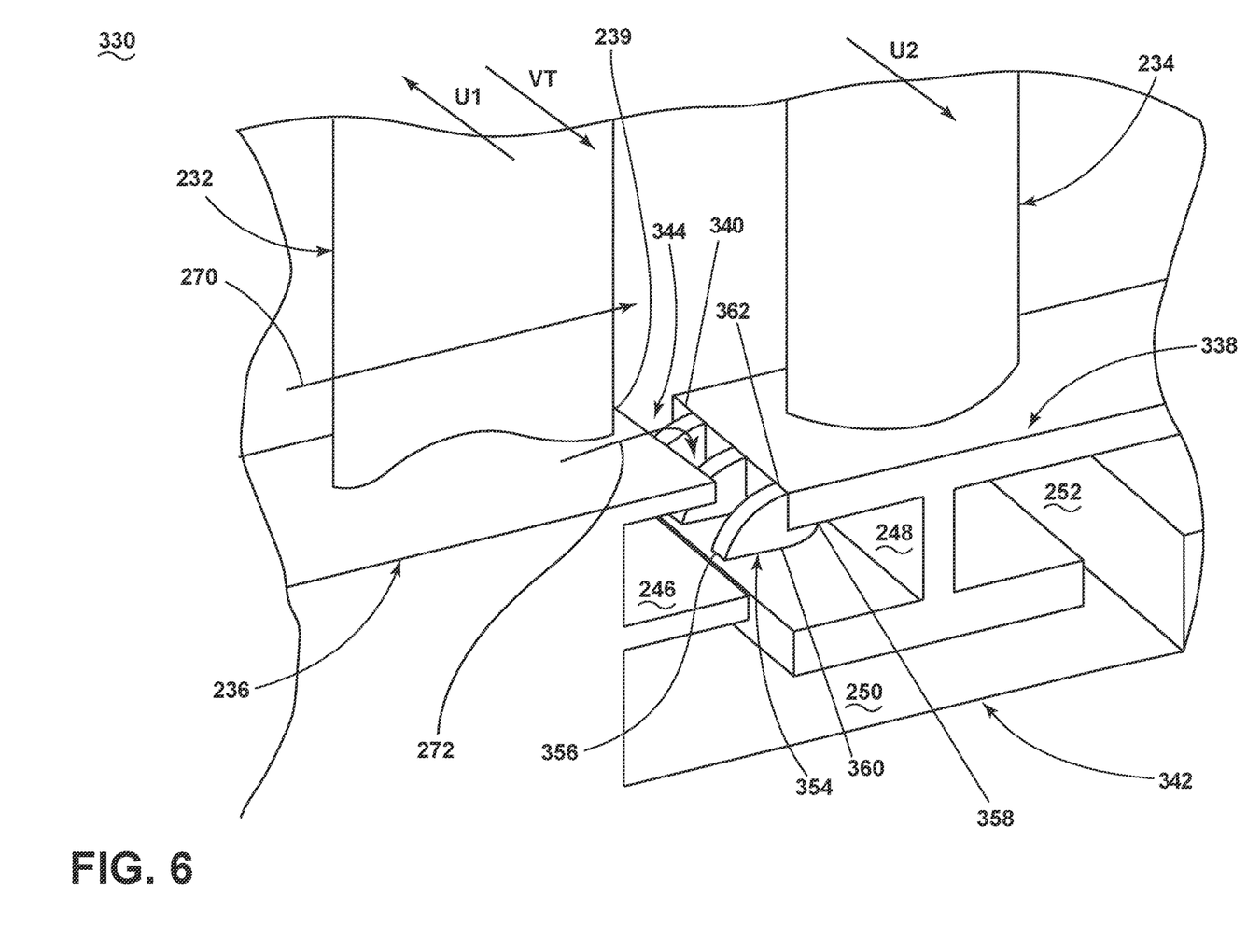
FIG. 6 is a perspective view of the turbine engine of FIG. 2, including the primary airflow path, and the secondary airflow path with an exemplary set of deflectors

FIG. 6 is a perspective view of an example airfoil assembly 330 of the turbine engine 110 of FIG. 2. The airfoil assembly 330 is similar to the airfoil assembly 230, therefore, like parts will be identified with like numerals increased by 100, with it being understood that the description of the like parts of the airfoil assembly 230 applies to the airfoil assembly 330 unless otherwise noted. Although illustrated as the turbine engine 110, it will be appreciated that aspects described herein of the airfoil assembly 330 can be applied to turbine engine 10 or any other turbine engine. It will be further appreciated that the airfoil assembly can include one or more airfoil with aspects of the airfoil 200 described in FIGS. 3-4.

An upstream edge 340 can be more radially toward the longitudinal axis 112 than a downstream edge 239 of first and second annular platforms 236, 338, respectively. Alternatively, the upstream edge 340 can be at the same radial height as the downstream edge 239. A set of deflectors 354 can be disposed on the second annular platform 338 from the upstream edge 340. At least a portion of the set of deflectors 354 can be disposed upstream the upstream edge 340. Specifically, a leading edge 356 of each corresponding deflector 354 can be disposed upstream the upstream edge 340. Additionally, the leading edge 356 can be disposed more radially toward the longitudinal axis 112 than an upper surface of the second annular platform, while a tip 362 can be at the same radial height or radially outward the upper surface of the second annular platform. As illustrated, a surface define as a ramp can join the tip 362 and the leading edge 356. The ramp can descend from the tip 362 to the leading edge 356 linearly or non-linearly. The ramp can follow a streamline of the of an airflow passing through at least a portion of the secondary airflow path 342. The ramp can be further defined facing upstream. The deflectors 354 can include a trailing edge 358 disposed downstream the upstream edge 340. The trailing edge 358 can include a curved portion which can curve in the direction opposing the second rotational velocity U2. Additionally, or alternatively, the curved portion can be defined as an inclined surface which faces downstream. The inclined surface can extend from a root 360 of the deflector 354 to a bottom wall of the second annular platform 338 at the trailing edge 358. The inclined surface can be linear or non-linear. The curved portion can be fully disposed against a lower surface of the second annular platform 338. The curved portion can form a turn for the cooling airflow entering the platforming inlet 344.

Benefits of the present disclosure include an increased efficiency of the rotational velocity of the second annular platform when applied to a counter-rotating turbine engine. The deflectors are disposed on the second annular platform are positioned such that they direct at least a portion of the working airflow in the same direction as the working airflow which exits the second airfoil at the trailing edge. As such, the deflectors can provide an additional thrust in the direction of the rotational velocity of the second annular platform other than the thrust created by the set of second airfoils. Traditional counter-rotating turbine engines do not use the deflectors as disclosed herein and therefore rely primarily on the thrust created by the airfoils mounted to the second annular platform to generate the thrust. As such, the present disclosure allows for an increased efficiency of the counter-rotating turbine engine.

Although described in terms of a counter-rotating turbine engine such as turbine engine 110, it will be appreciated that the present disclosure can be applied to a non-counter-rotating turbine engine such as turbine engine 10. As such, the second annular platform, and hence the second airfoil, can be stationary. In either case, the present disclosure can provide further benefits. These benefits can include a decrease in the resistance the first annular platform experiences due to the tangential velocity created by the working airflow within the primary airflow path. The set of deflectors can redirect the tangential velocity of the working airflow such that it is in the same direction as the rotational velocity of the first annular platform when it enters the secondary airflow path. Conventional turbine engines do not redirect the tangential velocity of the working airflow within the primary airflow path exiting the set of airfoils coupled to the first annular platform. As such, windage losses are experienced due to the fact that the secondary airflow enters the secondary airflow path in the same direction as the opposing tangential velocity. With implementation of the deflectors as described herein, the windage losses are avoided by redirecting the portions of the secondary airflow in the same direction as the tangential velocity to being same direction as the rotational velocity of the first annular platform. The avoidance of the windage losses results in the increase of the overall turbine engine efficiency.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An airfoil assembly defining a primary airflow path for a turbine engine comprising a platform, an airfoil extending from the platform and into at least a portion of the primary airflow path, the airfoil having an outer wall bounding an interior and defining a pressure side and a suction side extending between a leading edge and a trailing edge to define a chord-wise direction and extending radially between a root and a tip to define a span-wise direction, with the root being adjacent the platform, a secondary airflow path, comprising air from the primary airflow path, formed by at least a portion of the platform and a deflector provided on the platform and within the secondary airflow path.

The airfoil assembly of any preceding clause, wherein the deflector extends radially between a root and a tip, with the root being adjacent the platform.

The airfoil assembly of any preceding clause, wherein the deflector reduces at least one dimension of a cross-sectional area of the secondary airflow path at the deflector to form a reduced cross-sectional area.

The airfoil assembly of any preceding clause, wherein a local cross-sectional area of the secondary airflow path at a platform inlet is greater than the reduced cross-sectional area.

The airfoil assembly of any preceding clause, wherein a local cross-sectional area of the secondary airflow path at a platform inlet is less than the reduced cross-sectional area.

The airfoil assembly of any preceding clause, wherein the deflector forms a turn for a secondary airflow defined by a tangential velocity branching from the primary airflow path and entering the secondary airflow path.

The airfoil assembly of any preceding clause, wherein the deflector is a ramp.

The airfoil assembly of any preceding clause, wherein the ramp has an inclined surface facing downstream.

The airfoil assembly of any preceding clause, wherein the inclined surface follows a streamline of an airflow passing through the secondary airflow path.

The airfoil assembly of any preceding clause, wherein the inclined surface is linear.

The airfoil assembly of any preceding clause, wherein the inclined surface is non-linear.

The airfoil assembly of any preceding clause, wherein the airfoil is a rotatable blade.

The airfoil assembly of any preceding clause, wherein the airfoil is a non-rotatable vane.

The airfoil assembly of any preceding clause, wherein the deflector includes a pressure side aligned in the same circumferential directions as the pressure side of the airfoil.

An airfoil assembly defining a primary airflow path for a turbine engine comprising, a platform having first and second surfaces, an airfoil extending from one of the first and second surfaces and into at least a portion of the primary airflow path, the airfoil having an outer wall bounding an interior and defining a pressure side and a suction side extending between a leading edge and a trailing edge to define a chord-wise direction and extending radially between a root and a tip to define a span-wise direction, with the root being adjacent the one of the first and second surfaces, a secondary airflow path, comprising air from the primary airflow path, formed by at least a portion of the platform, and a deflector provided within the secondary airflow path.

The airfoil assembly of any preceding clause, wherein the deflector projects into the secondary airflow path.

The airfoil assembly of any preceding clause, wherein the deflector at least locally reduces a cross-sectional area of the secondary airflow path at the deflector to define a reduced cross-sectional area.

The airfoil assembly of any preceding clause, wherein the deflector forms a turn for a secondary airflow defined by a tangential velocity branching from the primary airflow path and entering the secondary airflow path.

The airfoil assembly of any preceding clause, wherein the deflector includes a pressure side aligned in the same circumferential directions as the pressure side of the airfoil.

A method of operating a turbine engine having at least one stage, in either a compressor section or a turbine section, having an upstream set of airfoils and a downstream set of airfoils, the method comprising rotating in a first rotational direction the upstream set of airfoils to generate an exit airflow leaving the upstream airfoils with a tangential velocity component opposite the first rotational direction, and deflecting at least a portion of the exit airflow, before it reaches the downstream set of airfoils, to have a tangential velocity component in line with the first rotational direction.

The method of any preceding clause, wherein the downstream set of airfoils are stationary.

The method of any preceding clause, wherein the downstream set of airfoils rotate in a second rotational direction.

The method of any preceding clause, wherein the second rotational direction is opposite the first rotational direction.

The method of any preceding clause, wherein a first rotational velocity in the first rotational direction is different from a second rotational velocity in the second rotational direction.

The method of any preceding clause, wherein the first rotational velocity is greater than the second rotational velocity.

What is claimed is:

1. An airfoil assembly defining a primary airflow path for a turbine engine, the airfoil assembly comprising:
   a platform at least partially defining a secondary airflow path fluidly coupled to the primary airflow path, the platform having an upper platform face at least partially defining the primary airflow path;
   an airfoil extending from the platform and into the primary airflow path, the airfoil having an airfoil outer wall defining an airfoil pressure side and an airfoil suction side; and
   a deflector provided along a portion of the platform axially forward of the airfoil, the deflector extending into the secondary airflow path, the deflector having:
   an axially forward edge provided within the secondary airflow path;
   an axially aft edge provided upstream of the axially forward edge; and
   a deflector wall defining a concave side and a convex side and extending between an axially forward edge and an axially aft edge;

wherein the deflector is oriented such that the concave side corresponds to the airfoil pressure side.

2. The airfoil assembly of claim 1, wherein the deflector reduces at least one dimension of a cross-sectional area of the secondary airflow path at the deflector to form a reduced cross-sectional area.

3. The airfoil assembly of claim 2, wherein a local cross-sectional area of the secondary airflow path at a platform inlet is greater than the reduced cross-sectional area.

4. The airfoil assembly of claim 2, wherein a local cross-sectional area of the secondary airflow path at a platform inlet is less than the reduced cross-sectional area.

5. The airfoil assembly of claim 1, wherein the airfoil is a rotatable blade.

6. The airfoil assembly of claim 1, wherein the deflector turns an airflow within the secondary airflow path from a first circumferential direction to a second circumferential direction, with the second circumferential direction corresponding to a direction of rotation of the airfoil assembly.

7. The airfoil assembly of claim 1, wherein the deflector is included within a plurality of circumferentially spaced deflectors provided along the platform.

8. The airfoil assembly of claim 1, wherein the deflector extends radially outward from the upper platform face.

9. A turbine engine comprising:
a primary airflow path;
an engine centerline;
a first airfoil assembly at least partially provided within a primary airflow path of the turbine engine, the first airfoil assembly being rotatable in a first rotational direction, the first airfoil assembly comprising:
a platform at least partially defining a secondary airflow path fluidly coupled to the primary airflow path, the platform having an upper platform face at least partially defining the primary airflow path;
a first airfoil extending from the platform and into the primary airflow path the first airfoil having an airfoil outer wall defining an airfoil pressure side and an airfoil suction side; and
a deflector provided along a portion of the platform axially forward of the first airfoil the deflector extending into the secondary airflow path, the deflector having deflector wall defining a concave side and a convex side, with the deflector being oriented such that the concave side corresponds to the airfoil pressure side of the first airfoil; and
a second airfoil assembly at least partially provided within the primary airflow path, the second airfoil assembly comprising a second airfoil provided upstream of and axially adjacent the first airfoil, the second airfoil assembly being rotatable in a second rotational direction that that is counter the first rotational direction.

10. A turbine engine comprising:
a primary airflow path;
a rotor;
a first airfoil assembly comprising:
a first platform having a first upper platform face at least partially defining the primary airflow path, the first airfoil assembly being radially spaced from the rotor to define a gap therebetween; and
a first airfoil extending from the first platform and into the primary airflow path, the first airfoil having an airfoil outer wall defining an airfoil pressure side and an airfoil suction side;
a second airfoil assembly comprising:
a second airfoil provided upstream of and axially adjacent the first airfoil; and
a second platform extending from the rotor;
a secondary airflow path at least partially defined by the gap between the first platform and the rotor, and the second platform; and
a deflector extending between an axially forward edge and an axially aft edge, the deflector being positioned within the secondary airflow path such that that the axially aft edge is upstream of the axially forward edge.

11. The turbine engine of claim 10, wherein the deflector is provided along a portion of the first upper platform face.

12. The turbine engine of claim 10, wherein the secondary airflow path is formed to channel a leakage airflow from a first region, upstream the first airfoil assembly, to a second region, downstream the first airfoil assembly.

13. The turbine engine of claim 10, wherein an inlet of the secondary airflow path is provided radially between the first platform and the second platform, with at least a portion of the deflector provided within the inlet.

14. The turbine engine of claim 10, wherein the second platform extends axially forward of and axially aft of the second airfoil.

15. The turbine engine of claim 10, wherein the secondary airflow path includes an inlet formed by a gap provided between the first platform and the second platform, with at least a portion of the deflector being provided within the inlet.

16. The turbine engine of claim 15, wherein the deflector is provided radially inward from a respective portion of the second platform forming the inlet.

* * * * *